March 17, 1970 — R. G. OSTROM — 3,500,576
REMOVABLY-WEIGHTED JIGGING LURE
Filed Feb. 27, 1968
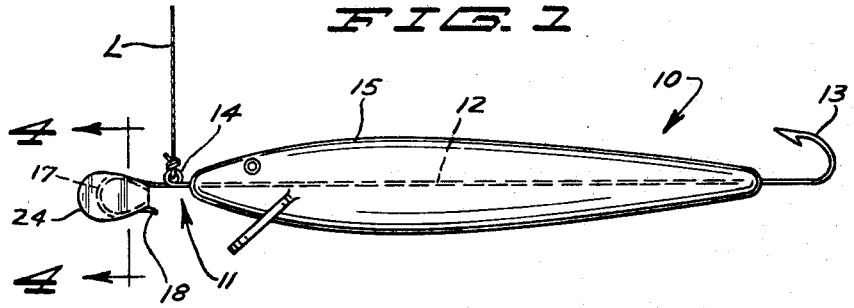
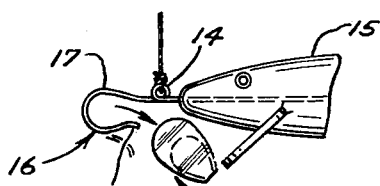
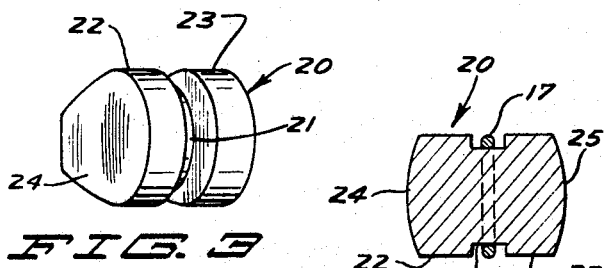
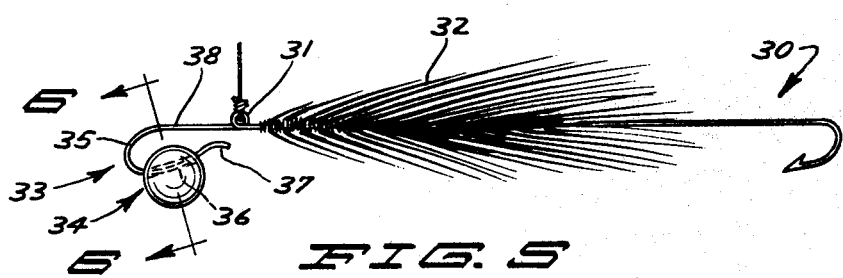
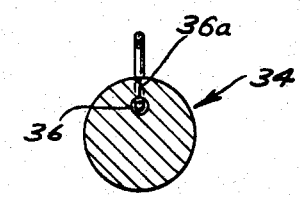
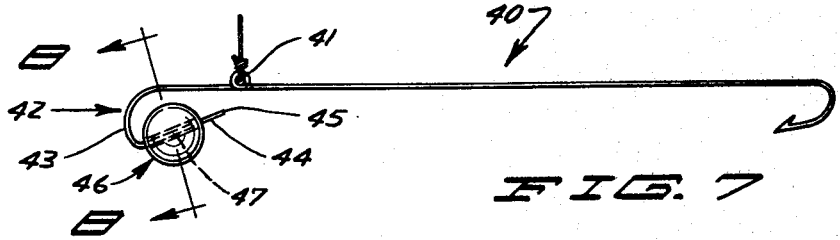
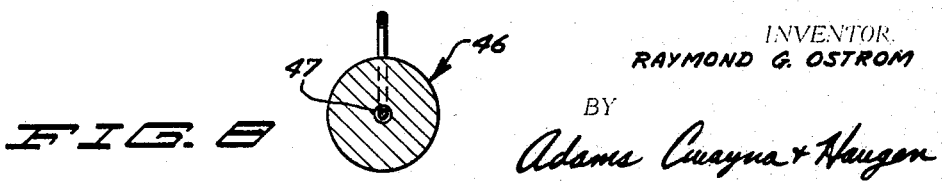
INVENTOR.
RAYMOND G. OSTROM
BY
Adams Cwayna & Haugen
ATTORNEYS

United States Patent Office 3,500,576
Patented Mar. 17, 1970

3,500,576
REMOVABLY-WEIGHTED JIGGING LURE

Raymond G. Ostrom, Minneapolis, Minn., assignor to Normark Corporation, Minneapolis, Minn., a corporation of Minnesota
Filed Feb. 27, 1968, Ser. No. 708,576
Int. Cl. A01k 95/00
U.S. Cl. 43—43.12      4 Claims

ABSTRACT OF THE DISCLOSURE

A weighted jigging lure having means for releasably holding a weight at its forward end which comprises a shank having eyelet means intermediate its length for securing a line thereto and a portion of the shank forwardly of the eyelet bent back on itself to form a spring clamping arm spaced from the shank. A weight is releasably inserted into the area between the shank and the arm and may be replaced with weights of different sizes. Should the lure become entangled in rocks or the like, a pull on the line will disengage the weight to allow retrieval of the lure.

---

In the past, various fishing lure devices have been provided, some of which include removable sinker devices and removable hook devices such that if the lure becomes lodged in rocks or the like the fisherman will be able to, by applying a sufficient pull on the line, separate the line from the lure or the like. In most of these situations the only portion which the fisherman retrieves is the line as the separation is usually provided to release the line from the lure.

The use of jigging lures is well known and these lures usually consist of a weighted head portion followed by the attracting portions of the lure wherein the line is securely fastened to an eyelet protruding from the weighted head. In the use of spinning equipment these lures vary in weight and the size of the heads therefore vary in dimensions while still maintaining the characteristics of a relatively large weighted head followed by the decorative portions of the lure. When using jigging lures, the lure is allowed to settle on the bottom and is jigged or pulled a short distance from the bottom and then allowed to return to the bottom. In this sequence it should be obvious that the weighted head naturally descends first and it is this portion of the of the lure which usually becomes imbedded in rocks or the like. With applicant's device of a removable weight portion it should be obvious that should the weighted section become lodged in rocks or the like a sufficient pull upon the line will disengage the weight from the lure and allow the line to retrieve the remaining portion of the lure.

In utilizing applicant's lure it should be obvious that since the weight is replaceable and removable one lure may be provided with a plurality of different size weights which will permit the fisherman to purchase a single lure along with a plurality of different size weights rather than purchasing complete lures of different weights.

It is therefore an object of applicant's invention to provide a fishing lure with means thereon for removably attaching a weight thereto which weight will be readably removable from the lure.

It is a further object of applicant's invention to provide a fishing lure or the like wherein a plurality of removable weights may be provided, each weight being of different respective weight to permit the user to change the entire weight of the unit as he desires.

It is a further object of applicant's invention to provide a fishing lure having a detaching and removable weight on the forwardmost end thereof which weight is not readily disengaged during casting procedures but which will be disengageable from the lure upon the application of predetermined amounts of force applied thereto.

These and other objects and advantages of my invention will more fully appear from the following description made in connection with the accompanying drawings, wherein like reference characters refer to the same or similar parts throughout the several views, and in which:

FIG. 1 is an elevation of a fishing lure embodying applicant's concept of a removable weight section on the forwardmost end thereof;

FIG. 2 is a partial view similar to FIG. 1 illustrating the removability of the weight;

FIG. 3 is a perspective view of the removable weight utilized in applicant's concept;

FIG. 4 is a section taken substantially along line 4—4 of FIG. 1;

FIG. 5 is a side view of a modified form of applicant's invention;

FIG. 6 is a section taken substantially along line 6—6 of FIG. 5;

FIG. 7 is still another modified view of applicant's concept; and

FIG. 8 is a section taken substantially along line 8—8 of FIG. 7.

In accordance with the accompanying drawings a fishing lure embodying applicant's concept is illustrated in its preferred form in FIG. 1 and is generally designated 10. The fishing lure in this form includes the hook portion generally designated 11 which includes a shank 12 and the standard barbed end portion 13 extending rearwardly from an eyelet 14 with the decorative or actual lure portion 15 mounted upon the shank portion 12. It should be obvious that many forms of attracting devices such as the lure 15 illustrated may be adapted to the shank portion and mounted securely thereon through various methods known to those skilled in the art.

Eyelet 14 is provided for attachment to the line L and in the form shown this eyelet 14 is provided at the forwardmost portion of the lure 15 and is provided by forming a circle in the wire of the hook 11. Extending forwardly from the eyelet portion 14 is a second hook-shaped element generally designated 16 which in the form illustrated includes a substantially arcuate curved section 17 which curve extends to slightly more than a 180° arcuate section to provide a rearwardly extending end 18 having a slight return bend thereon to facilitate insertion of a weight generally designated 20 therein. The bend section 17 and corresponding end 18 then provide through the flexibility of the wire normally utilized in such fishing hooks a relatively stationary weight-contacting portion which portion is that length of hook adjacent the eyelet 14 and a relatively flexible portion provided by the curved section 17 and extending end 18 which will move from normal capturing relationship with the stationary portion to a position as illustrated in FIG. 2 which will allow the weight 20 to move out of capturing position.

The weight 20 in this particular form includes a generally tear-shaped member having a relatively smoothly curved outer periphery with one end thereof being larger than the other end and provided with a generally arcuate groove 21 intermediate the longitudinal ends thereof, which groove 21 is provided at a greater depth on the enlarged end of said weight 20 than on the remaining portions thereof to permit, as shown in FIG. 1, the enlarged end of the weight 20 to extend beyond the capturing wire 17. This groove 21 then provides a pair of spaced-apart tear-shaped sections 22, 23 which would be in a position to abut with the rocks or the like which may entrap the lure.

It should also be obvious that the entire exterior surfaces 24, 25 of the tear-shaped sections 22, 23 could be radiused such that the weight 20 would take a substantially oblate shape. The basic concept of the weight 20 is to provide an area to receive the curved portion 17 of the weight-retaining element 16 therein which will, if entrapped, not press against the weight so as to prevent removal of the weight from the element 16.

When using lures weighted as illustrated in FIG. 1 the weight or front end thereof will naturally dip downward toward the lake bottom first and this is the area that will normally become entrapped in the rocks or other debris. Should the lure become entrapped in such a manner applicant has found that it is usually the enlarged weight which affords such trapping and by providing a device which releases the weight it will be possible to retrieve the remaining portions of the lure. In order to provide this release it should be obvious that the tear-shaped sections 22, 23 should not normally collapse inwardly entrapping the capturing wire 16.

By providing the weight 20 in the form shown it will be possible to, simply by altering the dimensions of the end tear-shaped sections 22–23, reduce or increase the weight of the device and the user will be able to purchase a single lure with a set of weights corresponding to the now available lures.

Although a tear-shaped configuration is illustrated it should be obvious that many forms, such as a cylindrical, grooved arrangement could accomplish the same results.

In use, with this particular model it should be obvious that the weight 20 will be properly aligned with the hook end 18 of the weight-entrapping element 16 to place the element 16 in the reduced central area 21 of the weight. The material from which the hook is formed is flexible enough that a person may do this very simply manually. Naturally, when casting this lure the weight will always be forward such that at the top of the back cast or in attempting to stop and control the forward cast the weight will abut with the curved section 17 of the weight-entrapping element 16 and not fly therefrom.

The modified form of the invention as illustrated in FIGS. 5 and 6 wherein a standard hook section now designated 30 is provided with an eyelet 31 and the decorative portions 32 attached therebehind with the weight-retaining section 33 arranged forwardly thereof including the weight 34 illustrated in proper position thereon. In the form shown the weight-retaining portion 33 generally conforms to the form illustrated in FIG. 1 with the exception that the bend portion 35 is slightly greater than a 180° angle to bend back upon itself. The weight 34 in the form shown provides a generally spherical member having a passage 35 therethrough which passage is offset with regard to the center of the sphere 34. In this particular situation it should be obvious that the extending end 37 of the retaining curved section 35 would be received through the passage 36 and normally hold the weight 34 at the bent-back portion thereof. This is to say that the curved section 35 would not permit the weight 34 to pass therearound so as to lie on the straight section 38 between the eyelet 31 and the curved section 35 but rather the weight 34 would be retained on the bent-back portion such that a rearward and upward force to expand the area between the end 37 and section 38 would permit the weight 34 to be removed from the device.

Also in this form the spherical weight 34 may be provided with a slit 36a extending from the outer periphery of the weight 34 into the passage area 36. This slit 36a would provide a second means for removing the weight 34 from the unit as the material from which these weights 34 are usually formed is soft lead and deformation to spread this slit 36a would be possible upon the application of a sufficient amount of force to remove the weight 34 from the unit without requiring that the same be passed over the end 37 of the weight retaining section 33.

A still additional modified form is illustrated in FIGS. 7 and 8 wherein the hook is designated 40 and is illustrated with no decorative devices thereon. The hook again provides an eyelet 41 with the weight-retaining section 42 extending forwardly therefrom and again providing a curved section 43 to again exceed 180° and provide a straight weight-retaining section 44 extending rearwardly therefrom to an end 45 spaced from the remaining portions of the hook. The weight generally designated 46 is again of generally spherical shape having a central passage 47 formed therethrough. The size of the weight 46, the accompanying straight section 44 and the curved section 43 of the hook will not permit the weight 46 to pass around the curve but will rather retain the same on the straight portion 44. With this particular unit the spacing between the end 45 of the weight-retaining section 42 and the remaining portions of the hook will not normally permit the weight 46 to pass rearwardly therefrom but requires a slight downward force to expand the area between the end 45 of the retaining section 42 and the hook portions to permit the same to pass completely off of the straight portion 44 and the end 45.

Obviously when utilizing this type of jigging lure the force applied by the line L will always be forwardly and upwardly in retrieving the lure. The releasable mechanism for holding the weights to the lure is actuated with a downwardly and rearwardly applied force such that when the weight is imbedded the applied force will be proper to remove the weight from the lure. The aspect of being able to retrieve the entire lure from rocks and the like is an important factor and, for example, when using the lure as illustrated in FIG. 1, the hook portion 13 will usually be elevated above the bottom of the lake and the snaring is usually not caused by the fish-catching hook. This is also true in the standard jigging lure as illustrated in FIG. 5. The flotation effects of the decorative material usually tends to retain the fish-catching hook at an elevated position with respect to the weight and it is the weight that usually becomes entrapped in snares and rocks. One other aspect of being able to provide a plurality of different-sized weights for use with the lures is attractive and will permit the fisherman to change the weights without untying the lure and will likewise permit him to buy a minimum of complete lures while purchasing only a complete stock of weights.

It will, of course, be understood that various changes may be made in the form, details, arrangements and proportion of parts without departing from the scope of my invention.

What is claimed is:
1. A fishing device including:
 (a) a shank providing eyelet means intermediate its length for securing the same to a fishing line;
 (b) said shank extending from said eyelet and being bent back on itself to form a spring clamping arm having a free end spaced from said shank, said free end thereof providing with said shank a weight receiving area into which a weight may be removably inserted, said free end being movable from said shank; and
 (c) a weight having a shank-receiving groove provided on at least selected portions of the periphery thereof receivable into the area defined by said shank and the free end thereof and removable therefrom upon the application of a predetermined removal force.

2. The structure set forth in claim 1 wherein said spring clamping arm is arranged forwardly of said eyelet and provides a generally arcuate capturing area for said weight.

3. The structure set forth in claim 2 wherein said weight includes a generally cylindrical body member having a pair of enlarged flange members respectively axially thereof to form the shank-receiving groove generally intermediate thereof to engage with said spring clamping arm.

4. The structure set forth in claim 2 wherein said weight includes a generally tear shaped body portion having a groove therein to provide a pair of shaped elements spaced by said groove.

References Cited

UNITED STATES PATENTS 2,593,220  4/1952  Thompson et al. _____ 43—42.09
2,674,823  4/1954  Gellings _____ 43—42.39
3,060,619  10/1962  Cornick _____ 43—42.39 X SAMUEL KOREN, Primary Examiner
DANIEL J. LEACH, Assistant Examiner U.S. Cl. X.R.

43—42.09, 42.37, 42.39, 42.49, 43.14, 44.81